United States Patent [19]

Kuenzel

[11] 4,379,471
[45] Apr. 12, 1983

[54] THREAD PROTECTOR APPARATUS

[76] Inventor: Rainer Kuenzel, 2 Gessner Rd., Houston, Tex. 77024

[21] Appl. No.: 216,154

[22] Filed: Dec. 15, 1980

Related U.S. Application Data

[63] Continuation-in-part of Ser. No. 957,139, Nov. 2, 1978, abandoned, which is a continuation of Ser. No. 835,750, Sep. 22, 1977, abandoned, which is a continuation of Ser. No. 667,320, Apr. 15, 1976, abandoned.

[51] Int. Cl.³ ............................................ F16L 55/10
[52] U.S. Cl. ...................................... 138/89; 138/96 T; 138/109; 138/165
[58] Field of Search ................... 138/96 R, 89, 96 T, 138/99, 109, 165; 220/233; 215/358, 43 A; 217/78, 79, 108; 85/7, 8.6, 8.8, 8.9; 403/308; 285/42, 373; 308/4 A

[56] References Cited

U.S. PATENT DOCUMENTS

| | | | |
|---|---|---|---|
| 2,143,480 | 1/1939 | Gunderman | 138/96 T |
| 3,744,528 | 7/1973 | Vestal | 138/96 R X |
| 4,139,005 | 2/1979 | Dickey | 138/96 T X |
| 4,146,180 | 3/1979 | Frosch et al. | 138/96 R X |
| 4,168,799 | 9/1979 | Turnek | 138/177 X |

FOREIGN PATENT DOCUMENTS 327682  1/1920  Fed. Rep. of Germany .... 138/96 R

Primary Examiner—James E. Bryant, III
Attorney, Agent, or Firm—Bard, Groves, Sroufe & Bishop

[57] ABSTRACT

A thread protector apparatus is disclosed for drill pipe. The apparatus is similarly constructed for both male and female threads. The apparatus utilizes an encircling tubular member which is spaced away from and concentric with the threaded portion of the drill pipe. At the edge of the tubular portion next to the end of the pipe, it is turned radially outwardly. The tubular portion supports a layer of resilient material adjacent to the threads. The resilient material is jammed against the threads by a wedge-shaped member which latches against the tubular member. The tubular member is provided with a number of tabs which protrude outwardly along angled directions to receive the tapered lock member. The tabs are adjacent a parallel protective ridge. The tapered lock is slidably inserted and removed. The tapered lock member has angled edges which match the angled directions of the upset members.

For both male and female versions of the apparatus, a cup-shaped end closure is disclosed. The end closure prevents the entry of fluid, trash or products in the drill pipe while it is in storage.

9 Claims, 7 Drawing Figures

THREAD PROTECTOR APPARATUS

RELATED APPLICATIONS

This application is a continuation-in-part of Application Ser. No. 957,139, filed Nov. 2, 1978, now abandoned, and that application, in turn, was a continuation of Application Ser. No. 835,750, filed Sept. 22, 1977, now abandoned, and that application, in turn, was a continuation application of Ser. No. 667,320, filed Apr. 15, 1976, now abandoned, all by the same inventor and bearing the same title.

BACKGROUND OF THE DISCLOSURE

In the manufacture, transport, storage and transfer to the field of drill pipe, the threads on the pipe are often damaged. The damage occurs to threads found at both ends. Drill pipe is manufactured with male and female threads on the two ends. Pipe thread protectors have been devised in the past and have been successful to some extent. However, the thread protector of the present invention provides a distinct advantage over previous devices. It is able to provide a hermetic seal when engaged with the threads. It is preferably installed on a drill pipe for the purpose of protecting the threads against physical abuse, but it also provides a seal protecting the threads which limits exposure of the threads to water vapors and reduces rust formation. This enables storage of pipe protected by the present invention for an indefinite interval.

An alternate male embodiment and a similar alternate female embodiment are also disclosed. These two embodiments cope with the problem that arises on accidental disengagement of the tapered or wedge-shaped lock member. The present apparatus thus discloses in an alternate form a mechanism which prevents accidental disengagement. As mentioned above, a lock member is slidably installed by bringing its edges (tapered at an angle equal to the angle of the upstanding tabs) against the tabs to draw the band tight, thereby jamming the resilient material against the threads. Pipe with thread protectors installed is often hauled aboard a truck subject to much vibration and pounding on the road, rough handling, loading and unloading, and is apt to be jarred. The jarring impact may, in some circumstances, jar the lock loose, thereby accidentally releasing the thread protector. The present apparatus prevents that, utilizing features in the alternate embodiment.

SUMMARY OF THE DISCLOSURE

The present invention is summarized as a thread protector for drill pipe. The thread protector includes embodiments for both the male and female threads found on the opposite ends of the drill pipe. The two are similarly constructed. Each embodiment incorporates a tubular member which is spaced approximately concentric with and some small distance from the threads. The tubular member has a coating of resilient material attached to it which is contacted against the threads in the relaxed position of the tubular member. The tubular member is better described as a strap which is equipped with a set of punched tabs in it which are set at angles to enable a lock member having tapered sides to engage the tabs and thereby alter the diameter of the tubular member. At the time of installation, the resilient material is jammed against the threads when the tubular member is altered in diameter. The tubular member has a number of edge-located tabs turned at ninety degrees to lock against the resilient material and secure it in position against the threads. The lock member is slidably installed by bringing its edges which are tapered at an angle equal to the angle of a set of upstanding tabs. This enables the thread protectors to be installed on the male or female threads and left indefinitely while providing a hermetic seal.

The lock member has a set of openings formed in it to engage a tee tab lock provided on the ring-shaped member which supports the resilient material. The tee tab lock carries a detent which protrudes into an opening in the lock member. This selectively locks the lock member against accidental disengagement and, more importantly, requires an affirmative act to disengage. A sharp object, such as the tip of a screwdriver, can be inserted through a strategically located opening to lever, pry or otherwise force the lock member free, thereby quickly disengaging it. A second opening can be utilized to catch against the tee tab detent so that the lock member slides free by a specified distance to relax the thread protector for disengagement, and, yet, the lock member remains affixed to the ring-shaped, tubular sleeve which defines the major structure of the thread protector.

In an alternate embodiment, a cup shaped end closure is disclosed for both the male and female thread protectors. The end closure extends inwardly into the ring-shaped, tubular member and is scored or cut for petal opening. The end closure is also provided with ribs for reinforcement.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
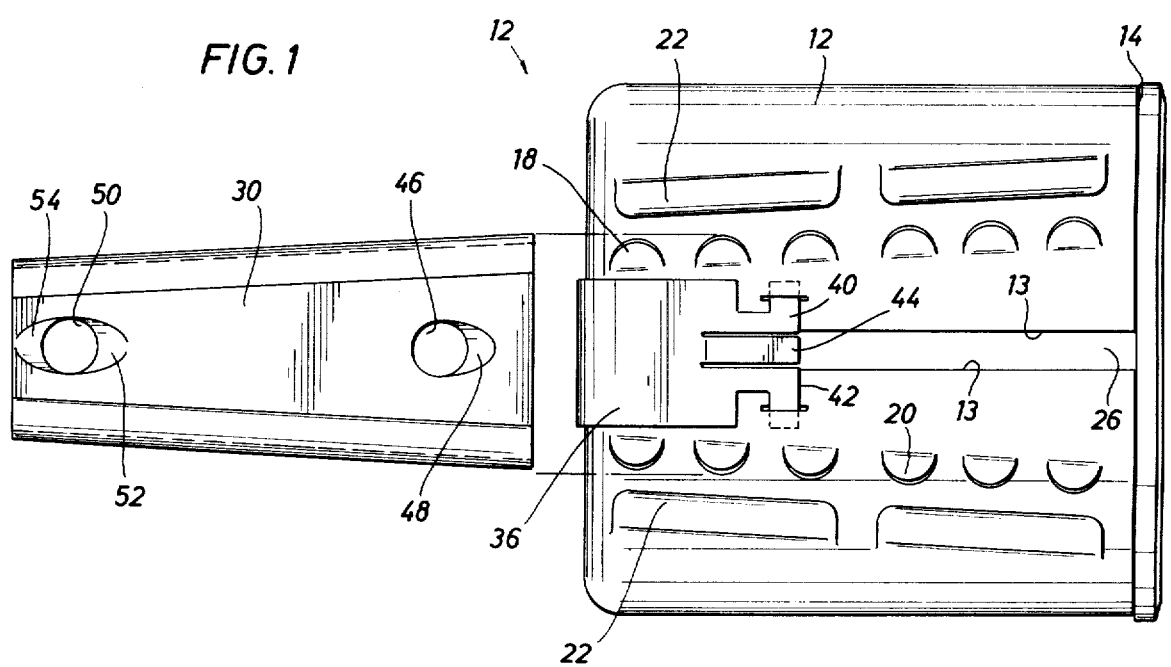
FIG. 1 shows a thread protector of the invention for positioning externally around a set of male threads on a drill pipe.

FIG. 1 shows a male thread protector 10 for mounting on the male threads of a drill pipe as more fully described in Application Ser. No. 957,139, filed Nov. 2, 1978, now abandoned which disclosure is incorporated by reference herein. Briefly, a drill pipe incorporates an externally threaded pin at one end and a box at the other end having a set of female threads cut in it. Thread protectors are disclosed by the present invention for protecting the threads of both the pin and box ends of the drill pipe.

Figure 3:
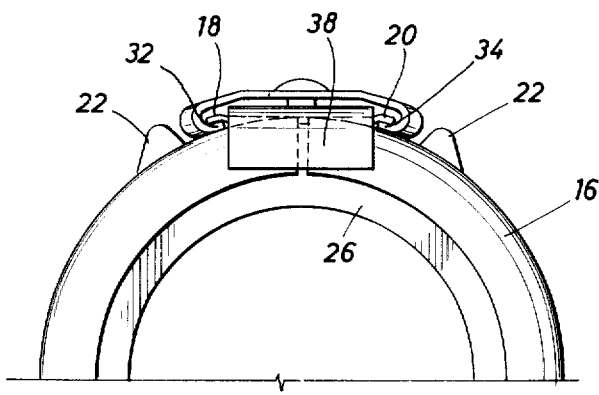
FIG. 3 is an end view of the thread protector shown in FIG. 1.

Turning now to FIG. 1, the male thread protector 10 incorporates a tubular member 12 which fully encircles the male threads of a drill pipe. The tubular member 12 has the form of an elongate strap including straight edges 13 at each end thereof. The elongate strap is shown in FIG. 1 after being bent to a tubular shape. The tubular member 12 has one circular edge 14 and the opposite edge is folded inwardly to form a circular flap 16 as best shown in FIG. 3.

In FIG. 1, a set of tabs 18 is shown punched in the stock which forms the tubular member 12, and they are turned up at about a forty-five degree angle. Several are punched as illustrated. They are punched along an angled line. The tabs are formed by partial perforations of a U-shaped cut. The cut material remains attached to the tubular member 12 and is bent at an angle. The bases of the tabs 18 defines a line which is not parallel to the edge 13. The angle between the edge and the tabs is typically three to eight degrees. A second set of tabs 20 facing the opposite direction is punched along an angled line close to the second of the edges 13. The angle of these tabs, when considered as a group, is the same as the angle of the tabs 18. The two sets of tabs define a pair of spaced shoulders which lock with an angled lock member to be described. The angle of the two respective sets of tabs is subject to variation over a limited range. It is desirable that there be some angle deviating from a perfectly parallel arrangement for easy withdrawal. The tabs are adjacent first and second protective ridges 22. They prevent physical abuse of the tabs.

Figure 2:
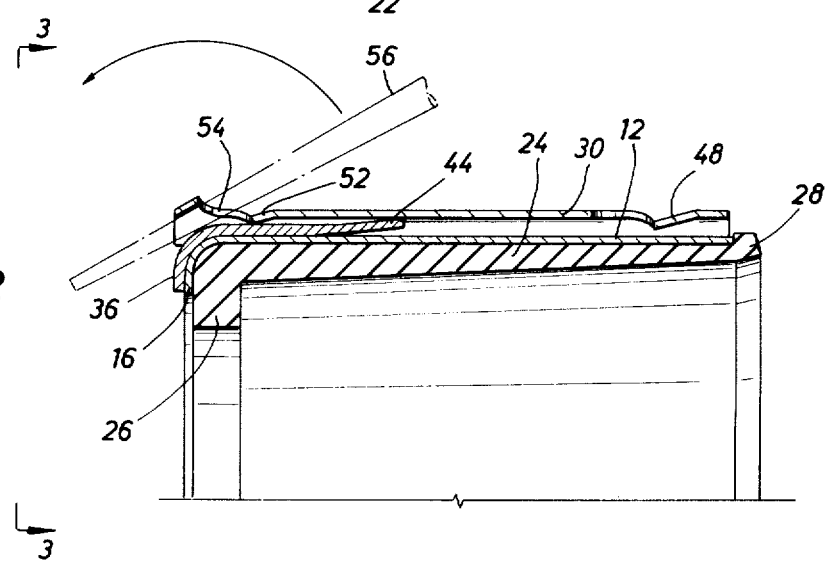
FIG. 2 shows a partial cross-sectional view of thread protector of FIG. 1 including a lever for disengaging the lock member.

A layer of resilient material 24 shown in FIG. 2 is placed on the inner side of the tubular member 12 formed from the strap. The layer of resilient material is adapted to be contacted against the threads. The resilient material extends radially inwardly at 26 adjacent to the circular flap 16 shown in FIG. 2. The resilient material is fairly thick. It is somewhat thinner at the opposite circular edge 28. This is to accommodate the taper formed in API standard threads. The resilient material covers all of the threads and extends slightly up past the first thread and onto the exterior of the pipe 12 a short distance above the first thread, typically a fraction of an inch. This dimension is subject to variation. At the opposite end, the resilient material 24 forms a slightly flared abutting shoulder 26 against the end of the pipe.

In FIG. 1, a lock member 30 is shown. The lock member 30 has two major sides which are set at an angle with respect to each other. The angle of the sides preferably matches the angle at which the tabs 18 and 20 are formed. As best shown in FIG. 3, a lip 32 is folded under at one edge, and the opposite edge lip 34 is also folded under. The lips are folded under to define a pair of facing slotted receptacles for receiving the tabs 18 and 20. The folded under lips 32 and 34 are preferably dimensioned so that they catch beneath the up-bent tabs 18 and 20. The tabs 18 and 20 extend upwardly and outwardly at about a forty-five degree angle. This angle can be varied as desired. The tabs 18 and 20 are pulled toward one another when the lock member 30 is placed in position. The lock member 30 tightens the tubular member 12, and as it is tightened, it pulls the resilient material snugly against the pipe threads, thereby sealing the threads against intrusion of moisture and placing the thread protector 10 in position. The lock member 30 provides adequate tightening to bring the resilient material into contact with the threads of the drill pipe. It can easily be placed on the thread protector by tapping with a blunt instrument, such as a rubber mallet.

Referring now to FIGS. 1 through 3 collectively, a tee tab lock member 36 is shown. The tee tab 36 is an elongate member fabricated from sheet stock material similar to the tubular member 12. One end 38 of the tee tab 36 is folded over to rest against the flap 16 of the tubular member 12. The longitudinal sides of the tee tab 36 are notched near the end opposite the folded end 38 to form arms 40 and 42 and thereby forming the general shape of a tee. The trunk of the tee portion is slotted to form a detent 44 that is angled upwardly above the planar surface of the tee tab 36. Slots are formed in the tubular member 12 for receiving the arms 40 and 42. When the tee tab 36 is positioned on the tubular member 12 as shown in FIG. 1, the arms 40 and 42 extend a sufficient distance into the slots to accommodate expansion and contraction of the tubular member 12 without disengaging therefrom.

The tee tab 36 selectively locks the lock member 30 against accidental disengagement. This is accomplished by providing an opening 46 at the large end of the tapered or wedge shaped lock member 30 as best shown in FIG. 1. The opening 46 is immediately adjacent to a semicircular indentation 48. The indentation protrudes toward the lower side. Thus, the edge extends downwardly or is recessed below the surface of the planar sheet material. In addition, there is a second circular hole or perforation 50 formed at the small end, and it includes a similar recessed indentation 52. The indentations 48 and 52 are similar, both being recessed or otherwise below the planar surface of the wedge-shaped member. There is an oppositely directed dished area 54 which protrudes above the planar surface. The circular opening 50 is thus immediately adjacent to the indentations 52 and 54 which bend in the opposite directions from one another, this being shown in detail in sectional view in FIG. 2. The circular opening 50 is thus immediately adjacent to the misshapened portion of the planar material so that a recessed side of the hole is arranged diametrically opposite from a raised lip or edge on the hole.

In FIG. 1, the tee tab 36 is shown attached to the tubular member 12. It will be noted that the tubular member 12 is expanded and that a gap exists between the facing straight edges 13 thereof. The tee tab 36 is substantially centered between the tabs 18 and 20 so that the detent 44 is positioned above the gap between the edges 13.

Turning now to FIGS. 2 and 3, the lock member 30 is shown completely engaged so that the tubular member 12 is contracted. The gap between the straight edges 13 of the tubular member 12 is decreased as best shown in FIG. 3. The position of the detent 44 relative to the gap remains substantially the same upon contraction of the tubular member 12 and is in substantial alignment with the lock opening 46 in the lock member 30. A pry bar 56 may be employed to disengage the lock member 30 as shown in FIG. 2. The pry bar 56 may be the blade of a screwdriver or the like. The pry bar 56 is slipped through the opening 50 and pried in the direction shown in FIG. 2 against the upstanding dish area 54 to force the lock member 30 to disengage. It is desirable, however, that disengagement of the lock member 30 be limited so that it does not separate from the thread protector 10. This is achieved by the tee tab 36 in the following manner. As the lock member is disengaged from the thread protector 10, the nether side thereof slides over the detent 44. When the opening 46 of the lock member 30 is positioned over the detent 44, the tip of the detent 44 protrudes upwardly through the opening 46. At this point, an interference occurs which prevents the lock member 30 from escaping. It simply cannot be pulled off by sliding movement. The lock member 30 sufficiently engages against the resilient expansion of the material 26 coupled via the tabs 18 and 20 to maintain the gap between the edges 13 so that the arms 40 and 42 of the tee tab 36 do not disengage from the tubular member 12. The lock member 30 can be removed quite easily by simply pressing the detent 44 downwardly against the resilient material 26. The detent 44 will flex and press below the edge of the opening 46. However, this takes an intentional act on the part of an installer and, therefore, is a fail safe system which keeps the lock mechanism affixed to the tubular member 12. With this construction, the lock member 30 is held in position indefinitely, but it is held in a storage position which prevents its escape.

Figure 4:
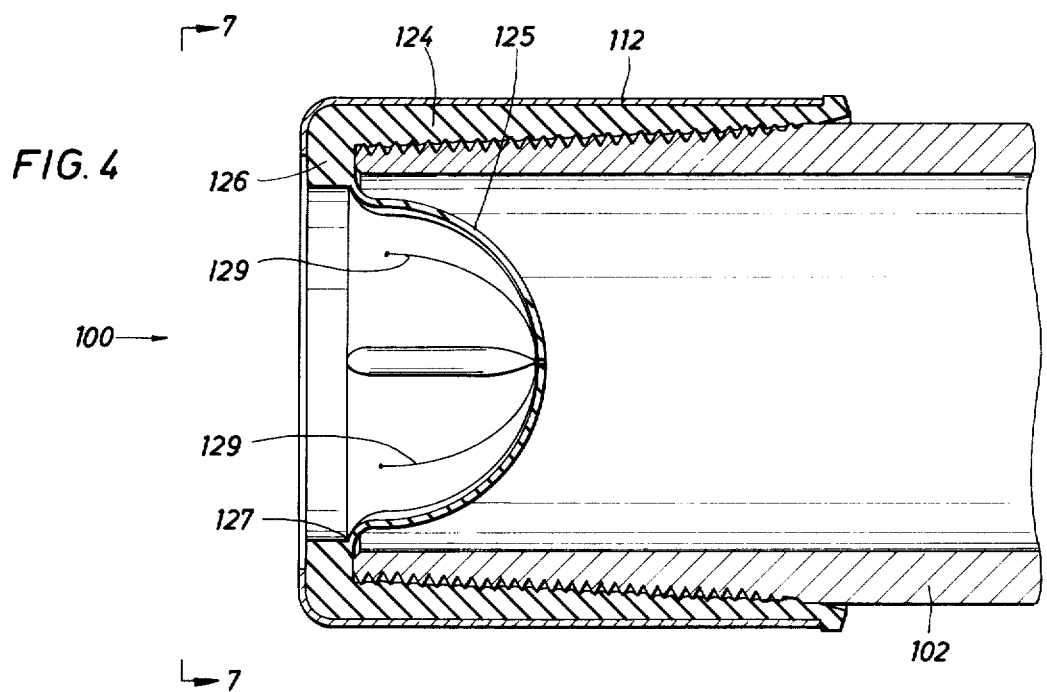
FIG. 4 is a cross-sectional view of an alternate embodiment of the invention showing an externally positioned thread protector around a set of male threads on a drill pipe.

Turning now to FIGS. 4 through 7, an alternate embodiment of the thread protector of the invention is shown. The male thread protector 100 of the alternate embodiment is shown in FIG. 4 mounted on the male threads of a drill pipe 102. The male thread protector 100 incorporates a tubular member 12 which fully encircles the male threads. A layer of resilient material 124 adapted to be contacted against the pipe threads is attached to the inner side of the tubular member 112. To this extent, the thread protector 100 is identical to the thread protector 10 previously described. The thread protector 100 also includes a lock means as shown in FIGS. 1 through 3. The lock means is not shown in FIG. 4 for the sake of clarity.

The resilient material 124 extends radially inwardly at 126 adjacent to the end of the drill pipe. The resilient material is fairly thick at this point. A foamed polyurethane will suffice. At the thinner areas, the resilient material can be heavier density to obtain a thin but strong material. A cup-shaped end closure 125 extends inwardly from the inner circumferential edge 127 of the resilient material at 126. The end closure 125 is fabricated from the same resilient material and is integral with the resilient material 124. The end closure 125 is substantially thinner than the resilient material at 126. The end closure 125 prevents the entry of fluid, trash or rodents in the drill pipe while it is in storage.

Figure 7:
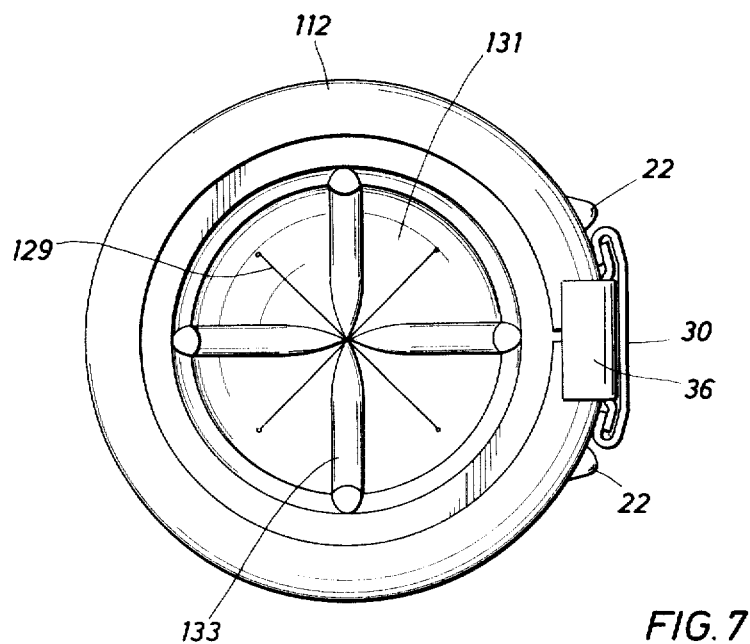
FIG. 7 is an end view of the thread protector of the invention showing the scored end closure.

The end closure 125 comprises a solid piece of resilient material across the pipe opening. It is preferred that the end closure 125 include a cup-like shape as shown in FIG. 4 extending inwardly to the interior of the well pipe. Further, it is preferred that the end closure 125 be scored or cut as shown at 129. Several cuts are preferred to permit petal opening of the end closure 125. In end view, the cuts 129 form an "X" pattern as shown in FIG. 7. Petal opening of the end closure 125 is desirable because drill pipe is most often moved from one place to another with a crane or the like. Hooks are suspended from the crane for hooking the ends of the pipe. A hook may easily penetrate the scored end closure 125 of the present invention without damage and may also easily disengage therefrom.

Referring now to FIG. 7, it will be observed that the several petals 131 are provided with ribs 133. The ribs 133 extend radially from the center of the end closure 125 to the circumferential edge 127. The ribs 133 divide the petals 131 substantially in half and reinforce the end closure 125 so that complete recovery is obtained once a hook or other object is removed. Although the end closure 125 is scored, a 95% vapor barrier may be maintained because the resilient petals fall back to the relaxed shape.

Figure 5:
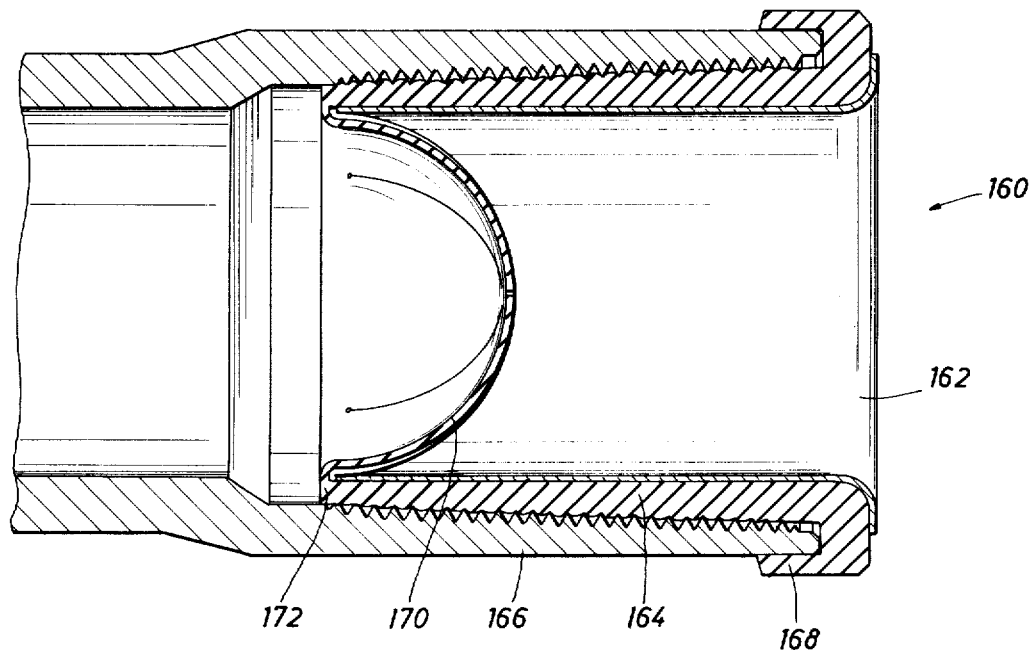
FIG. 5 is a cross-sectional view of an alternate embodiment of the invention showing an internally positioned thread protector engaging a set of female threads on a drill pipe.

A female thread protector 160 is disclosed is FIG. 5. The thread protector incorporates a tubular member 162 receivable in the box end of a drill pipe. A layer of resilient material 164 is bonded on the outer side of the tubular member 162. The layer of resilient material is adapted to be contacted against the threads of the drill pipe. The resilient material has an extent which covers all of the threads and extends slightly up past the first thread and on to the exterior of the drill pipe 166 forming a lip 168 which engages the outer periphery of the pipe 166. In this respect, the thread protector 160 is identical to the female thread protector described in Application Ser. No. 957,139, filed Nov. 2, 1978 now abandoned. The lock means is not shown for the sake of clarity; however, it is understood that thread protector 160 includes a lock means as disclosed in Application Ser. No. 957,139, which disclosure is incorporated by reference herein.

Referring again to FIG. 5, it will be noted that the resilient material 164 is thicker at one end thereof. This is to accommodate the taper of the drill pipe threads. Like the thread protector 100 shown in FIG. 4, the female thread protector 160 includes a cup shaped end closure 170. The end closure 170 is integral with the resilient material 164 and extends from an inner edge 172. The apex of the end closure 170 extends toward the open end of the drill pipe 166 as shown. It will be observed that the end closure 170 is scored and ribbed as previously described in the description of the end closure 125.

Figure 6:
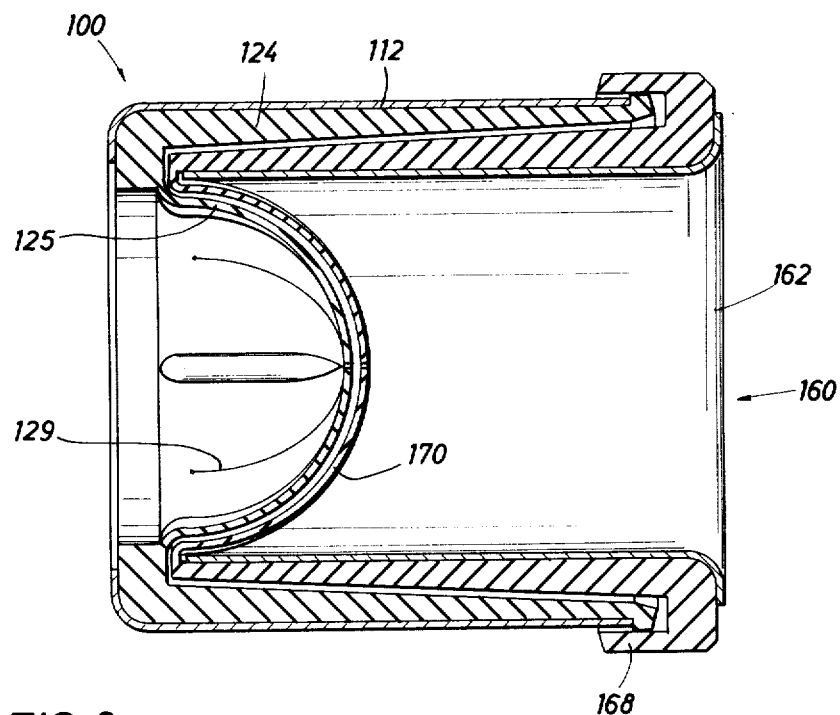
FIG. 6 is a cross-sectional view of the female thread protector nestled in the male thread protector for convenient storage.

In FIG. 6, the thread protectors of the invention are nestled one within the other. This feature of the invention permits stacking the thread protectors for easy storage. The resilient material comprising the thread protectors is a mixture of thermoplastic rubber and rubber crumbs or dust having suitable material properties. The rubber crumbs are formed by shreading old rubber tires or the like to form a crumblike material. The thermoplastic rubber and the rubber crumbs are mixed in substantially a 4 to 1 ratio to form the resilient material employed by the present disclosure. For example, the resilient material of the present disclosure may comprise 15-20% thermoplastic rubber and 80-85% rubber crumbs. The resilient material is highly stretchable without tearing, in the range of 300% to 500% elongation. It also recovers to its original shape after stretching or deformation; substantially 100% recovery being possible. The density may be variable, however, the preferred range is 1.2 to 1.6 pounds per cubic foot.

While the foregoing is directed to the preferred embodiment of the present invention, other and further embodiments of the invention may be devised without departing from the basic concept thereof, and the scope thereof is determined by the claims which follow.

I claim:

1. A thread protector apparatus adapted to be installed on the threaded end of a pipe comprising:
   a flexible member having first and second ends and an elongated portion therebetween which flexible member is capable of being drawn into a tubular configuration in which said first and second ends are spaced by a first distance when said thread protector apparatus is in an unlocked state and spaced by a second distance when said thread protector apparatus is in a locked state;
   a resilient material member formed concentrically with said flexible member and adapted to be contacted against threads on the end of a pipe;
   first and second tab means formed on said first and second end portions of said flexible member respectively;
   a locking means comprising a wedge shaped locking member for operatively contacting said first and second tab means for altering the circumference of said flexible member from a relaxed size corresponding to the unlocked state to a locking size corresponding to the locked state and wherein said tabs and said locking member are formed such that camming of said tabs by said locking member urges said resilient member against the threads of the pipe; and
   detent means supported at one end to and extending from said flexible member and having an end portion positioned intermediate said tab members for bias against said locking means.

2. The apparatus according to claim 1 wherein said detent means comprises an arm member cantilevered to said flexible member.

3. The apparatus according to claim 2 wherein said locking means comprises an opening in registration with said detent means in the direction of travel of said locking means and wherein said end portion of said detent means is positioned for engaging said opening at a preselected point of travel of said locking means from said locked to said unlocked state, whereby said locking means may remain mounted to said flexible member when said thread protector is not in the locked state, and wherein said detent means is deformable to permit movement of said end portion to a position free of engagement with said locking means.

4. The apparatus according to claim 3 wherein said flexible member supports a shoulder adjacent to said resilient material for limiting motion of and locating said resilient material at the end of the threaded portion of the drill pipe.

5. The apparatus according to claim 4 wherein said locking means comprises an aperture for receiving lever means and wherein said aperture is positioned with respect to said shoulder members such that said shoulder member may serve as a fulcrum for removing said locking member from said flexible member.

6. The apparatus according to claim 5 wherein said resilient material further comprises end closure means for closing the end of the pipe and defining a recessed configuration scored to form flexible petals, said petal members being deformable to provide visual access into a pipe and elastomerically biased to return an initial position for closing the pipe end.

7. The apparatus according to claim 1 wherein said resilient material member is adapted to be placed on the inside of a pipe, said tab means and said locking means comprises means for moving said first and second ends farther apart.

8. The apparatus according to claim 1 wherein said resilient material member is adapted to be placed on the outside of a pipe and said tab means and said locking means comprise means for moving said first and second ends closer together.

9. The apparatus according to claim 8 wherein said resilient material is provided radially inwardly with respect to the tubular configuration and said tabs are formed exteriorly thereof and wherein said flexible member further comprises first and second ridges respectively adjacent said first and second tab means for providing a load bearing surface adjacent each said tab means.

* * * * *